(12) United States Patent
Tikka et al.

(10) Patent No.: US 8,891,412 B2
(45) Date of Patent: Nov. 18, 2014

(54) CIRCUIT CONFIGURATION FOR A MOBILE RADIO DEVICE AND METHOD FOR OPERATING THE SAME

(75) Inventors: Pasi Tikka, Unterhaching (DE); Christian Block, Stainz (AT); Andreas Przadka, Munich (DE); Gerhard Zeller, Munich (DE); Peter Hagn, Finsing (DE)

(73) Assignee: Epcos AG, Munich (DE)

( * ) Notice: Subject to any disclaimer, the term of this patent is extended or adjusted under 35 U.S.C. 154(b) by 645 days.

(21) Appl. No.: 12/765,589

(22) Filed: Apr. 22, 2010

(65) Prior Publication Data

US 2010/0265852 A1   Oct. 21, 2010

Related U.S. Application Data

(63) Continuation of application No. PCT/EP2008/063899, filed on Oct. 15, 2008.

(30) Foreign Application Priority Data

Oct. 23, 2007   (DE) .................. 10 2007 050 606

(51) Int. Cl.
*H04B 1/44*      (2006.01)
*H04W 88/02*   (2009.01)
*H04B 1/00*      (2006.01)

(52) U.S. Cl.
CPC .................................. *H04B 1/0057* (2013.01)
USPC ....................................................... 370/278

(58) Field of Classification Search
CPC ...... H04B 1/006; H04B 1/0057; H04B 1/005; H04B 1/0053; H04B 1/0071
USPC ......... 370/276, 277, 278, 310, 328, 329, 335; 455/73, 550.1, 552.1, 553.1
See application file for complete search history.

(56) References Cited

U.S. PATENT DOCUMENTS

| | | | |
|---|---|---|---|
| 7,142,884 B2 * | 11/2006 | Hagn | 455/552.1 |
| 7,171,235 B2 | 1/2007 | Haapoja | |
| 7,187,945 B2 * | 3/2007 | Ranta et al. | 455/552.1 |
| 7,305,250 B2 | 12/2007 | Choi | |
| 7,349,717 B2 * | 3/2008 | Block et al. | 455/552.1 |
| 7,408,900 B2 * | 8/2008 | Hunkeler | 370/331 |
| 7,477,915 B2 * | 1/2009 | Leinonen et al. | 455/550.1 |
| 7,676,244 B2 * | 3/2010 | Park et al. | 455/552.1 |
| 7,949,341 B2 * | 5/2011 | Wessel van Rooyen | 455/452.1 |
| 8,139,540 B2 * | 3/2012 | Khlat et al. | 370/331 |

(Continued)

FOREIGN PATENT DOCUMENTS

| | | |
|---|---|---|
| DE | 100 54 968 A1 | 5/2002 |
| DE | 102 00 048 A1 | 7/2003 |

(Continued)

*Primary Examiner* — Chi Pham
*Assistant Examiner* — Robert Lopata
(74) *Attorney, Agent, or Firm* — Slater & Matsil, L.L.P.

(57) ABSTRACT

A circuit arrangement for a mobile radio device includes a first transmission path for a first communication system with TDD duplex operation and a second transmission path for a second communication system with FDD duplex operation. The first transmission path contains a first transmission filter and the second transmission path contains a first duplexer. The first and second communication systems use transmission frequency bands that are arranged within the same octave. A transmitted signal from the first communication system can be routed switchably and thus either via the first or the second transmission path.

18 Claims, 4 Drawing Sheets

(56) References Cited

U.S. PATENT DOCUMENTS

| | | |
|---|---|---|
| 2002/0016183 A1* | 2/2002 | Lehtinen .................. 455/553 |
| 2002/0086650 A1 | 7/2002 | Haapoja |
| 2004/0259594 A1 | 12/2004 | Choi |
| 2006/0121937 A1* | 6/2006 | Son .......................... 455/553.1 |
| 2006/0194550 A1 | 8/2006 | Block et al. |
| 2006/0256754 A1* | 11/2006 | Liu et al. .................. 370/335 |
| 2007/0042802 A1 | 2/2007 | Park et al. |
| 2007/0243832 A1* | 10/2007 | Park et al. .................. 455/73 |
| 2009/0003286 A1 | 1/2009 | Korden et al. |
| 2009/0093270 A1* | 4/2009 | Block et al. .............. 455/552.1 |

FOREIGN PATENT DOCUMENTS

| | | |
|---|---|---|
| DE | 10 2004 049 684 A1 | 4/2006 |
| EP | 1 755 230 A2 | 2/2007 |
| WO | WO-2004/088865 A1 | 10/2004 |

* cited by examiner

CIRCUIT CONFIGURATION FOR A MOBILE RADIO DEVICE AND METHOD FOR OPERATING THE SAME

This application is a continuation of co-pending International Application No. PCT/EP2008/063899, filed Oct. 15, 2008, which designated the United States and was not published in English, and which claims priority to German Application No. 10 2007 050 606.8 filed Oct. 23, 2007, both of which applications are incorporated herein by reference.

TECHNICAL FIELD

The invention relates to a circuit arrangement as may be used in modern mobile radio devices which are equipped for multiband/multimode operation.

BACKGROUND

Multiband operation is understood to mean a method of operation which can operate to send and receive in multiple transmission and reception bands in the same transmission standard. Multimode operation is understood to mean a method in which the mobile radio device can operate in different transmission and reception bands in different mobile radio standards. Modern mobile radio devices are equipped for multiband and multimode operation and can send and receive in seven different communication systems, for example.

Furthermore, modern mobile radio devices may have further complementary reception devices, for example UHF transmitters/receivers, DVB-H (Digital Video Broadcast-Handheld) receivers, Bluetooth, WLAN (Wireless Local Area Network), WiMAX, GPS (Global Positioning System) and so on. Advantageously, transmission and reception devices are implemented on a single board for all of the wireless systems.

The complementary transmission and reception systems, which are not associated with a mobile radio communication system, are usually designed for continuous reception in their respective allocated reception band or are not synchronized to the transmission and reception bands of the communication systems. The reception can or is intended to be effected in parallel with the operation of a communication system. In this context, it is possible to use the same antenna for the complementary systems and the communication systems. However, in most cases a second antenna which matches the requirements of the respective complementary radio system is usual.

The close physical proximity of communication system and complementary radio means that there is a high level of coupling between the antenna signal (transmitted signal) from the mobile radio unit and the radio signal from the complementary radio. In this case, interference frequencies situated outside the transmission/reception bands of the communication systems can occur which, although they do not interfere with the communication, significantly impair the reception quality in a complementary radio system. In some cases, this problem can be solved by virtue of communication systems and complementary radios operating in different time slots. In most cases, however, this is not possible on account of a lack of synchronization between the signals or in the case of continuous operation of these signals (such as in the case of WCDMA and DVB-H). By way of example, the transmitter in an EGSM communication system can interfere with one or more of the complementary radio systems.

Although it is possible to filter out the fundamental frequency of the transmitted signal in the complementary radio system since the reception band of the complementary radio system and the transmission/reception bands of the communication systems are different, the transmitter additionally produces interference signals at frequencies which are situated in the reception band of the complementary radio and, for example, can be attributed to broadband noise from the power amplifier or to parasitic leakage signals from the transmission device.

SUMMARY

In one aspect, the present invention specifies a circuit arrangement for a mobile radio device which can effectively reject noise produced at the transmission end or other interference signals.

A circuit arrangement is specified which has a first transmission path for a first communication system with TDD (Time Division Duplexing) duplex operation and a second transmission path for a second communication system with FDD (Frequency Division Duplexing) duplex operation. The first transmission path contains a first transmission filter and the second transmission path contains a first duplexer.

In this case, the circuit arrangement is in a form such that the transmitted signal from the first communication system can be routed switchably via the first or the second transmission path. In this way, it is possible either to send the transmitted signal from the first communication system through the first transmission filter arranged in the first transmission path, which is usually a low-pass filter, or to route it via the duplexer or the transmission filter element thereof. The proposed switchable second transmission path can now be used to subject the transmitted signal from the first communication system to more effective bandpass filtering via the relevant filter element of the duplexer. The result of this is that good attenuation is achieved outside of the passband of the transmission filter in the duplexer, even in ranges of the frequency spectrum which are more remote from the passband. This allows out-of-band interference produced by the transmission unit to be effectively attenuated. In particular, it is thus possible to attenuate interference which is situated in the reception range of complementary radios which are possibly present, so that, despite simultaneous transmission operation of the first communication system, reception is made possible in the radio systems without interference from the first communication system.

For sending and receiving, communication systems with TDD duplex operation operate with a time offset in what are known as time slots, which are respectively reserved for transmission or reception operation. Normally, the transmission and reception frequencies or the frequency bands allocated to the transmission and reception operation are also different in this case. Such a communication system is the GSM (Global System for Mobile Communications) standard, for example.

Communication systems with FDD duplex operation, such as the CDMA (Code Division Multiple Access) or WCDMA (Wideband Code Division Multiple Access) standard, send and receive in different transmission and reception bands which are not divided into time slots, so that sending and receiving are possible simultaneously. This requires a duplexer for isolating the signals. The duplexer comprises two filter elements which are passively connected up such that they reject in the respective passband of the other filter element. This can be implemented using a quarter-wave line or another circuit producing an appropriate phase rotation, for example.

The two filter elements of a duplexer are respectively in the form of a bandpass filter, these being able to be arranged on a common substrate or on different substrates. The filter elements of the duplexer may be of the same or else of different filter type. By way of example, it is thus possible to produce duplexers from two SAW (Surface Acoustic Wave) filters or from two BAW (Bulk Acoustic Wave) filters. However, it is also possible to produce a duplexer from two filters designed using different engineering, each filter element being able to be matched to the relevant requirements of the respective transmission or reception band.

A particular advantage is a circuit arrangement which additionally has at least one reception path with a reception filter for a first radio system, the received signals of which can be received in parallel with and hence at the same time as the transmission of the first communication system. Such parallel operation (sending in the first communication system and receiving in the first complementary radio system) is then possible, in line with the invention, without interference if the transmitted signal from the first communication system is routed via the second transmission path and hence through the transmission filter element of the duplexer. Interference-free reception in the first complementary radio system is achieved by virtue of the better filter action of the bandpass filter in the duplexer in comparison with the transmission filter from the actual first transmission path, which is in the form of a low-pass filter.

In one exemplary embodiment, the circuit arrangement has a third transmission path for a third communication system with FDD duplex operation, which uses a transmission frequency band which is adjacent to the transmission frequency band of the second communication system. The third transmission path contains a second duplexer. The circuit arrangement can then provide the option for the transmitted signal from the first communication system to be selectively routed via the first transmission path, the second transmission path or else via the third transmission path. This is advantageous if the first transmission path is a common transmission path for a first and a further communication system with TDD duplex operation, which, in "normal operation", are routed via a single transmission filter in the form of a low-pass filter in order to filter out harmonics. If the second and third communication systems with FDD operation now use similar frequency bands for transmission and reception operation to those of the first and further communication systems with TDD operation, the circuit arrangement proposed here can be used to route the transmitted signal via that transmission path (second or third transmission path) which best matches the respective transmission band in terms of frequency.

In one refinement of the circuit arrangement, the first and second communication systems use the same antenna. The first and second transmission paths are therefore connected to one and the same antenna connection.

The first complementary radio system, which is designed to operate (sending or receiving) with the proposed circuit arrangement in parallel and hence at the same time in one of the communication systems, may be selected from GPS (Global Positioning System), DVB-H (Digital Video Broadcasting-Handheld), Bluetooth, UHF broadcast radio, WLAN (Wireless Local Area Network) or WiMAX.

In a further embodiment, the circuit arrangement comprises an antenna switch which either individually connects at least the transmission and reception paths of the first and second communication systems to the antenna connection or isolates them therefrom again. It is also possible to connect all the transmission and reception paths of all the communication systems to the antenna connection by means of an antenna switch.

The transmission paths of various communication systems may be connected to form a common transmission path in the circuit arrangement, provided that they use the same transmission frequency ranges, adjacent transmission frequency ranges or transmission frequency ranges which are situated in one another. The common transmission path may then contain a low-pass filter, the passband of which allows the transmission frequency bands of the two communication systems to pass. In this case, however, only transmission paths of communication systems with TDD duplex can be combined during operation.

In a further embodiment, the proposed circuit arrangement may have a common power amplifier for the transmitted signals from those communication systems whose transmission frequency bands are situated in a first frequency range. Similarly, a further common power amplifier may be provided for the transmitted signals from the communication systems whose transmission frequencies are situated in a second frequency range. By way of example, the first frequency range may comprise transmission frequencies up to one gigahertz, whereas the second frequency range comprises transmission frequencies between 1.6 and two gigahertz. In this case, it may be advantageous to also provide a respective dedicated antenna for the first and second frequency ranges which is able to be used as a common transmission and reception antenna in this context.

However, it is also possible to provide a common power amplifier for all frequency ranges or all possible transmission frequency bands between 450 MHz and 2.5 GHz. One possible frequency range for a common power amplifier may also be situated between 800 MHz and 2 GHz.

In a further embodiment, common power amplifiers may be provided for the transmitted signals from those communication systems which have the same duplex operation. Thus, a common power amplifier may be provided for the transmitted signals from the communication systems with TDD duplex operation, and a second power amplifier may be provided for the transmitted signals from those communication systems with FDD duplex operation.

Preferably, the chip components of one or more duplexers in the circuit arrangement are mounted on a multilayer substrate and particularly on a ceramic multilayer substrate. The multilayer substrate may have integrated passive circuit elements, selected from resistors, capacitances and inductances. These may then be produced in the form of one or more appropriately designed metallizations within the multilayer substrate.

Furthermore, yet further chip components may be provided on the multilayer substrate, for example at least one power amplifier. The antenna switch may also be produced as a semiconductor component and hence as a chip component and mounted on the multilayer substrate.

By way of example, a circuit arrangement may have transmission and reception paths for seven different communication systems, for example for the seven GSM bands (GSM 850, GSM 900, GSM 1800, GSM 1900) and for the three WCDMA bands WCDMA 850 (Band V), WCDMA 900 (Band VIII), WCDMA 1800 (Band III) and WCDMA 1900 (Band II). The concept can be extended to all nine bands which are currently already being operated or to further bands which are already being discussed as possible extensions today.

BRIEF DESCRIPTION OF THE DRAWINGS

The invention is explained in more detail below with reference to exemplary embodiments and to the associated figures. The figures serve merely to illustrate the invention and are therefore only in schematic form.

DETAILED DESCRIPTION OF ILLUSTRATIVE EMBODIMENTS

Figure 4:
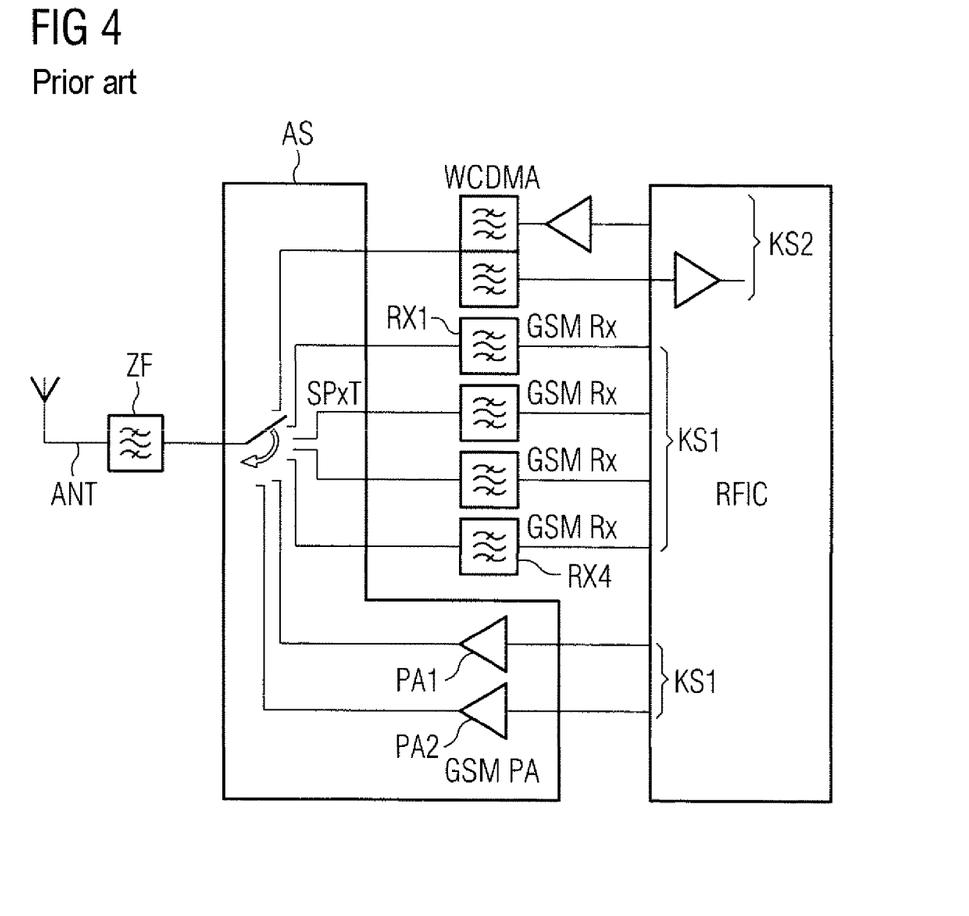
FIG. 4 shows a known frontend module in a schematic illustration.

FIG. 4 shows an inherently known arrangement as may be used in a modern mobile radio. This circuit arrangement comprises an antenna ANT which is connected to an antenna switch AS. This may be in the form of an SPxT (Single Pole X Throw) switch which selectively connects the antenna to a duplexer DX for a communication system with FDD duplex operation, to one of a plurality of reception filters RX1 to RX4 for communication systems with TDD duplex operation or to a power amplifier PA1, PA2 for one or more communication systems with TDD operation. The number X in the SPxT switch denotes the number of different switch positions, with the switch making only one connection respectively. In all the communication systems, transmission and reception parts may be integrated in a common radio frequency chip IC (transceiver). By way of example, this contains low-noise amplifiers (LNA) for the reception paths of all the communication systems, of which the figure shows only one amplifier for a second communication system KS2.

The antenna path ANT may contain an additional filter ZF which can be used to filter out interfering noise in order to improve the reception quality in complementary radio systems operating in parallel, which reception quality would otherwise be adversely affected by the noise coupling to the antenna. Although such a filter improves the noise and hence the reception quality of the complementary radios, it results in increased attenuation for the communication systems, since the attenuation of the additional filter ZF is added to the attenuation of the individual transmission and reception filters.

Figure 5:
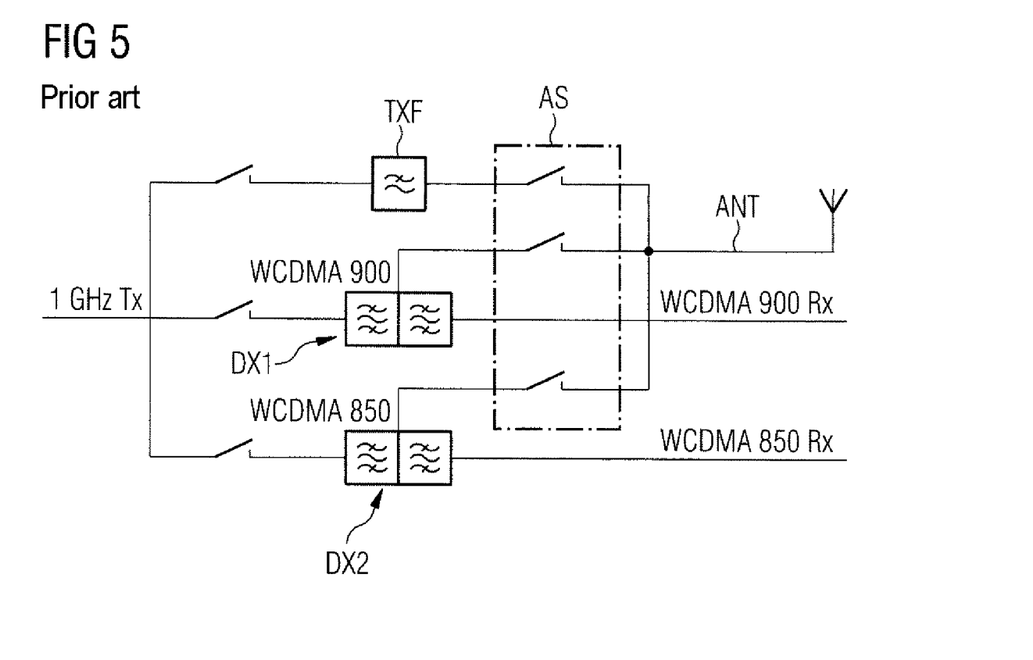
FIG. 5 shows an inherently known circuit arrangement with a first, a second and a third transmission path which are connected to a common antenna.

FIG. 5 shows details of a further known circuit arrangement with a common transmission path for a first and a further communication system with TDD duplex operation. This common transmission path contains a transmission filter TXF which is in the form of a low-pass filter. The common transmission path is connected to a first antenna path ANT. Likewise connected to the antenna path is the input of a first duplexer DX1 for a second communication system with FDD duplex operation, and a second duplexer DX2 for a third communication system with FDD operation.

A first filter element of each of the two duplexers DX1, DX2 is connected to a transmission path, whereas the second filter element is respectively connected to the reception path of the respective communication system. The antenna path ANT is connected to either a transmission filter TXF or a duplexer input, respectively, by means of antenna switches AS, all the antenna switches being able to be implemented in a single switch component, for example in a diode component produced in silicon, a CMOS switch or a gallium arsenide switch. Further switches connect the TX filter TXF to the transmission input, and the reception filters of the two duplexers DX1, DX2 to the reception input of the transmission/reception IC (transceiver), which may be an integrated component in which, additionally, the reception part of the circuit arrangement may also be integrated. These switches, shown on the left in the figure, may also be implemented in a single switch component.

The transmission filter TXF for at least one first communication system may be a common transmission filter for the transmission paths of a GSM 850 (in this case: first communication system) and a GSM 900 system (further communication system), for example. The second communication system with the first duplexer DX1 is the WCDMA system 900, while the third communication system with the second duplexer DX2 may be the WCDMA 850 system, for example. All three communication systems operate at the same or similar frequencies, so that they can operate with one antenna for transmission and reception operation without any problems. Furthermore, this antenna can also be used as a transmission and reception antenna for the second frequency range between 1700 and 1800 megahertz.

Figure 6:
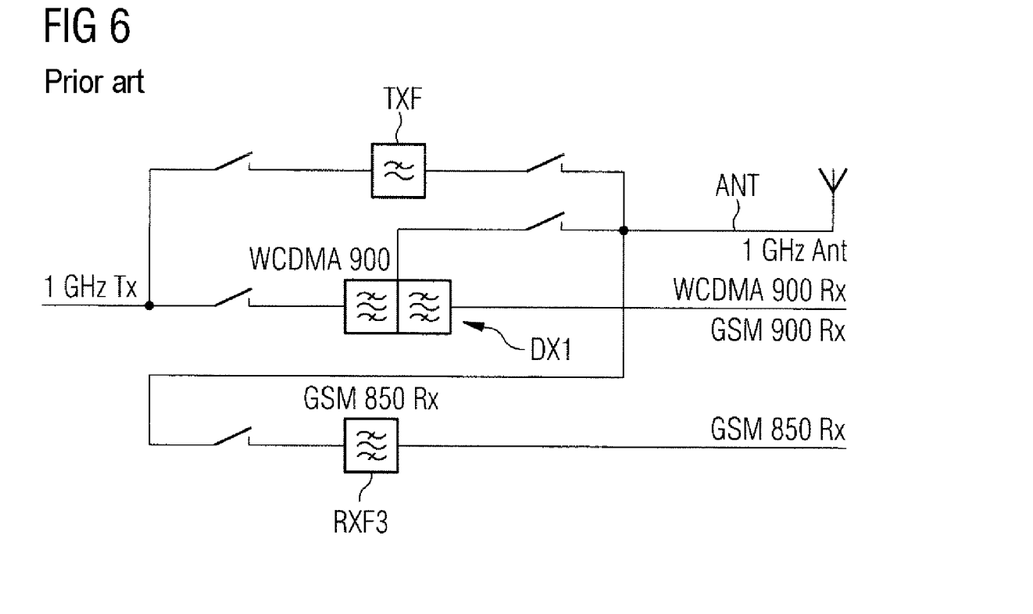
FIG. 6 shows an inherently known circuit arrangement with a first transmission path for a first communication system and a common transmission path for two further communication systems.

FIG. 6 shows a contrastingly simplified circuit arrangement which in turn has a common transmission path with a first transmission filter TXF for a first (in this case GSM 900) and a further first communication system (in this case GSM 850) with TDD duplex operation, has a transmission path with a duplexer DX1 for a second communication system with FDD duplex operation (in this case WCDMA 900), and has a reception path with a reception filter RXF3 for the further first communication system (in this case WCDMA 850) with TDD operation. At the same time, the filter RXF3 is also used as a reception filter for the further communication system (in this case GSM 850). The Rx filter of the duplexer DX1 is also used as a reception filter for the first communication system (GSM 900). In this simplified known circuit arrangement, good compatibility for the first and second communication systems (GSM 900 and WCDMA 900) is obtained.

Figure 7:
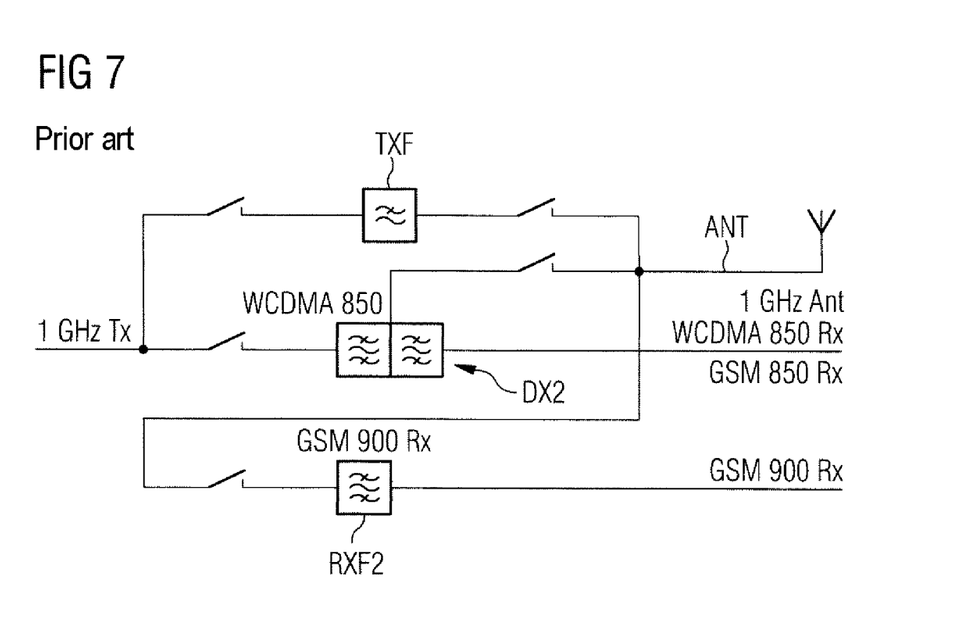
FIG. 7 shows a circuit arrangement with a first transmission path and a further common transmission path for two further communication systems.

A further variant of this inherently known circuit arrangement is shown in FIG. 7, in which the second duplexer DX2 of the third communication system (WCDMA 850) is also used as a reception filter for the first communication system with FDD operation (in this case GSM 850). The filter RXF2 is a reception filter for the further first communication system (GSM 900). The common transmission path for the first and further (first) communication systems (GSM 850 and GSM 900) has a low-pass filter TXF, as in the arrangement shown in FIG. 6. In this case, good compatibility between the third communication system (WCDMA 850) and the first TX system (GSM 850) is obtained.

Figure 8:
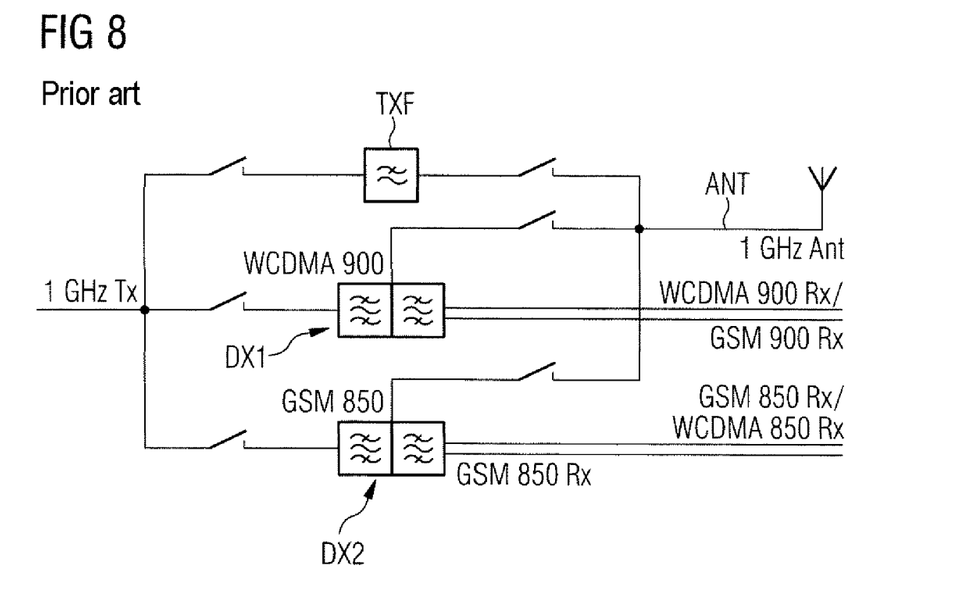
FIG. 8 shows a circuit arrangement with three transmission paths, wherein two transmission paths are associated with communication systems with FDD duplex operation and symmetrical signal routing at the receiver end.

FIG. 8 shows an inherently known circuit arrangement which, in principle, has the function of the arrangement from FIG. 5, in which a respective duplexer is provided for a second and a third communication system (WCDMA 850 and WCDMA 900). For the common transmission path of the first and further (first) communication systems (GSM 850 and GSM 900) with TDD duplex operation, a common transmission filter TXF (low-pass filter) is provided. In addition, the reception filters of both duplexers are in the form of balanced filters with balanced signal routing. In this case, each of the two duplexers DX1, DX2 of the second and third communication systems is additionally used as a reception filter for a respective one of the first (GSM 850) and further (first) communication systems (GSM 900), that is to say for two communication systems with TDD operation, the circuits shown basically in FIG. 6 or 7 being able to be applied in similar fashion.

Figure 1:
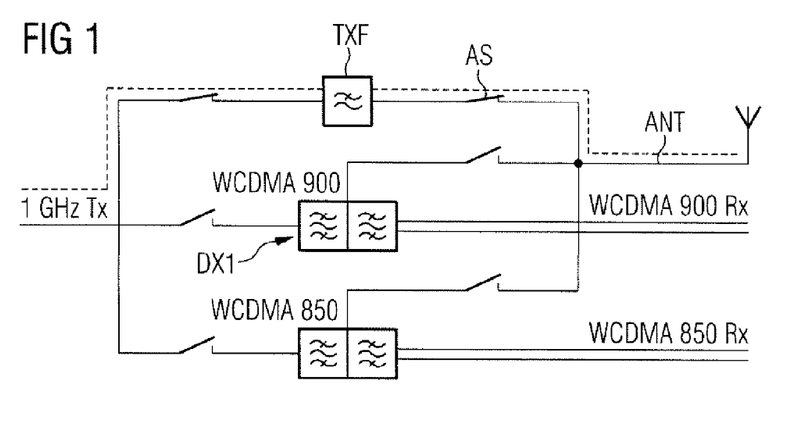
FIG. 1 shows details from a circuit arrangement in a first mode in schematic form.

FIG. 1 shows a circuit arrangement according to the invention in the first operating state, which corresponds to the normal known operating state, as used for the known arrangement shown in FIG. 5. In this operating state, appropriate closed switches AS connect the common transmission path for the first and further communication systems with TDD operation, for example for GSM 850 and GSM 900 megahertz, firstly to the antenna path ANT and secondly to the TX or transmission chip and particularly to the power amplifier. The filtering by means of the transmission filter TXF is effected using a low-pass filter, which is only suitable for filtering out harmonics which cannot be completely rejected in the power amplifier. Residual low-frequency and remote interference, which can adversely affect the parallel operation of a complementary radio system in the case of simultaneous transmission operation via the first or further communication system, since they can result in interference with the reception in this case.

Figure 2:
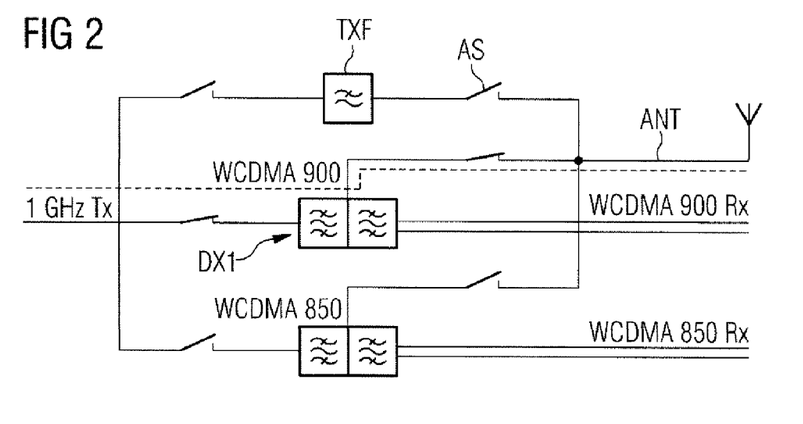
FIG. 2 shows the arrangement in a second mode.

FIG. 2 shows the same arrangement in a second new operating state, in which appropriately closed switches AS connect the second transmission path with the first duplexer DX1 contained therein to the antenna path ANT. In this operating state, the transmission operation of the first communication system (in this case GSM 900 megahertz) is effected via the transmission filter element of the first duplexer DX1 (in this case WCDMA 900 megahertz). Since the first and second communication systems have transmission frequency bands which match in terms of frequency, this results in improved filtering of the transmitted signal from the first communication system in the second operating state in comparison with the first operating state. The bandpass filtering prompts relatively high-frequency or low-frequency interference to be filtered out, so that particularly in adjacent frequency ranges it is possible to receive complementary radio systems, possibly operated in parallel, without interference. The dashed line in FIG. 2 illustrates the transmission path for the first communication system.

Figure 3:
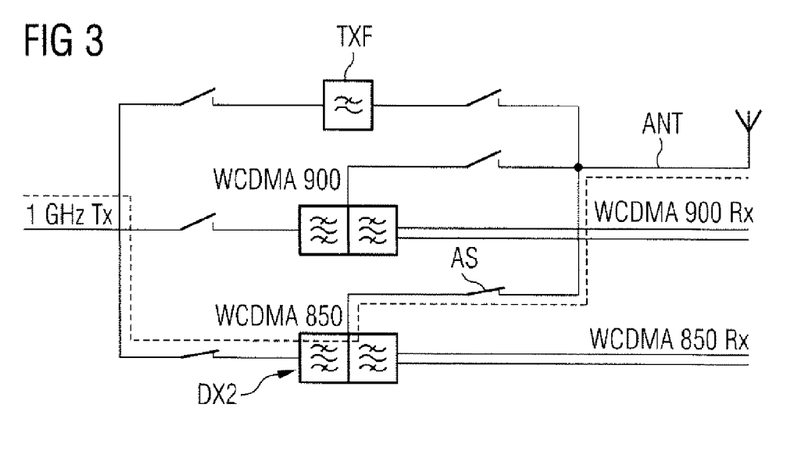
FIG. 3 shows the arrangement in a third mode.

FIG. 3 shows the circuit arrangement in a third operating state. In this case, appropriately closed switches connect the TX transmission chip of the circuit arrangement to the antenna path ANT via the third transmission path of the third communication system (in this case: WCDMA 850), and the TX transmission chip is used as transmission path for the further communication system with TDD duplex operation (GSM 850). On account of the matching transmission frequencies of the further first communication system and the third communication system, particularly good bandpass filtering of the transmitted signal is obtained in this case too and allows interference-free operation of parallel complementary radio systems.

Since the filtering of a transmitted signal using a TX filter element of a duplexer DX provides a higher level of attenuation in comparison with filtering of the transmitted signal using a low-pass filter TXF, the second and third operating states of the arrangement are used only when transmission operation via the first and further first communication systems together with reception operation in a complementary radio system are intended to be effected in parallel. In this case, the relatively high insertion loss and hence the relatively high power consumption of the power amplifier are accepted on account of the thus improved reception in a complementary radio system. Without parallel reception operation in an adjacent or remote frequency band, the first operating state is preferred.

The invention is used in a simple manner without additional filter chips or other complex measures to reject the noise produced during transmission operation by communication systems with TDD operation. In this case, the switching between the (known) first operating state and the new operating states shown in FIGS. 2 and 3 is respectively effected by means of an appropriate switch position for switches which are already present in corresponding known circuits (see FIGS. 5 to 8). The invention thus uses simple actuation of switches without any increased complexity to allow transmission operation which is improved in terms of interfering noise and which, as stated, allows the parallel reception of complementary radio systems.

The invention is not limited to the figures or the exemplary embodiments. The illustrated embodiments for the 1 GHz range can be transferred to combinations of first and second operation systems in the 2 GHz range. In this context, the core of the invention is respectively that the transmitted signal from at least one TDD operating system is routed via the transmission path of a second communication system with FDD duplex operation and hence via the corresponding transmission filter element, provided that the transmission bands match in terms of frequency or provided that the transmission band of the TDD system is fully contained in the frequency range of the transmission band of the FDD system. A circuit arrangement may then have different operating states both for the first and for the second frequency range (1 GHz or 2 GHz) with the inventive use of the duplexers for the transmission operation in the TDD system.

In this context, the invention can be used to filter out not only low-frequency interference but also radio frequency interference, so that complementary radio systems with higher or lower frequencies than the operating frequency of the relevant transmission band can be operated without interference. The invention is independent of the filter engineering used, which, as stated, may have SAW, BAW or combined filters and duplexers. If appropriate, the new proposed operating states may require matching, which can be provided by means of appropriate passive circuit components. Components used for a matching network may be integrated in the same substrate, in particular, on which the filters and duplexers in the form of discrete components are mounted.

What is claimed is:

1. A circuit arrangement for a mobile radio device, the circuit arrangement comprising:
    a first transmission path for a first communication system with TDD duplex operation, wherein the first transmission path contains a first transmission filter;
    a second transmission path for a second communication system with FDD duplex operation, wherein the second transmission path contains a first duplexer; and
    a third transmission path for a third communication system with FDD duplex operation configured to use a transmission frequency band that is adjacent to the transmission frequency band of the second communication system, wherein the third transmission path contains a second duplexer; and
    a path for a radio system including a receive filter,
    wherein the first, second and third communication systems are configured to use transmission frequency bands that are identical, overlapping or adjacent, and wherein a transmitted signal from the first communication system can be routed switchably via the first transmission path or, when the radio system is operating simultaneously with the first communication system, via the second or third transmission path.

2. The circuit arrangement as claimed in claim 1, wherein the first and second communication systems are configured to operate in the same transmission frequency band.

3. The circuit arrangement as claimed in claim 1, wherein the first and second communication systems are configured to use transmission frequency bands that overlap one another.

4. The circuit arrangement as claimed in claim 1, wherein the first and second communication systems are configured to use transmission frequency bands that are adjacent one another.

5. The circuit arrangement as claimed in claim 1, wherein the first and the second communication systems use the same antenna so that the first and second transmission paths are connected to the same antenna connection.

6. The circuit arrangement as claimed in claim 1, wherein the radio system is selected from the group consisting of GPS, DVB-H, Bluetooth, broadcast radio, WLAN or WiMAX.

7. The circuit arrangement as claimed in claim 5, further comprising an antenna switch that either connects the transmission paths and reception paths of the first and second communication systems to the antenna connection or isolates the transmission paths and reception paths of the first and second communication systems from the antenna connection.

8. The circuit arrangement as claimed in claim 1, wherein the first communication system and the radio system are adjacent to one another in terms of transmission frequency band.

9. The circuit arrangement as claimed in claim 3, further comprising:
    a first common power amplifier for transmitted signals from the communication systems, the transmission frequency bands of which are situated within the same octave, and
    a further common power amplifier for transmitted signals from the communication systems, the transmission frequency bands of which are situated within a next octave,
    wherein the transmission paths connect the power amplifier to an antenna switch or to an antenna connection.

10. The circuit arrangement as claimed in claim 1, wherein the first transmission filter of the first communication system comprises a low-pass filter.

11. The circuit arrangement as claimed in claim 1, the first duplexer comprises a chip component on an SAW or BAW basis and is mounted on an integrated ceramic multilayer substrate.

12. The circuit arrangement as claimed in claim 11, wherein at least one power amplifier and an antenna switch are also mounted on the multilayer substrate.

13. The circuit arrangement as claimed in claim 1, wherein the circuit arrangement has reception and transmission paths for seven different communication systems.

14. The circuit arrangement as claimed in claim 1, further comprising:
    a first common power amplifier for all communication systems with FDD duplex operation; and
    a second common power amplifier for all the communication systems with TDD duplex operation.

15. The circuit arrangement as claimed in claim 1, further comprising an SP3T or SP4T switch for connecting the transmission paths to an antenna.

16. A method for operating a circuit arrangement, wherein the circuit arrangement comprises:
    a first transmission path for a first communication system with TDD duplex operation, wherein the first transmission path contains a first transmission filter;
    a second transmission path for a second communication system with FDD duplex operation, wherein the second transmission path contains a first duplexer; and
    a third transmission path for a third communication system with FDD duplex operation that uses a transmission frequency band that is adjacent to the transmission frequency band of the second communication system, wherein the third transmission path contains a second duplexer; and
    a path for a radio system including a receive filter;
    the method comprising:
    transmitting a transmission signal of the first communication system in the first transmission path through the first transmission filter when not operating the radio system; and
    transmitting the transmission signal in the second or third transmission path of the second or third communication system through the first or second duplexer when operating the radio system.

17. The method as claimed in claim 16,
    wherein operating the radio system comprises receiving a reception signal at the radio system at the same time as the transmission signal is transmitted,
    wherein the first communication system is a GSM system, and
    wherein the second or third communication system is a WCDMA system.

18. The method as claimed in claim 16, wherein the first, second and third communication systems use transmission frequency bands that are identical, overlapping or adjacent.

* * * * *